United States Patent
Dhillon et al.

(10) Patent No.: US 10,453,282 B2
(45) Date of Patent: Oct. 22, 2019

(54) EV CHARGING CONNECTOR UNLOCK VIA BIOMETRIC INPUT

(71) Applicant: Ford Global Technologies, LLC, Dearborn, MI (US)

(72) Inventors: Jaswant-Jas S. Dhillon, Canton, MI (US); Ryan Hunt, Ferndale, MI (US); Kevin James Rhodes, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 15/683,578

(22) Filed: Aug. 22, 2017

(65) Prior Publication Data

US 2019/0066416 A1    Feb. 28, 2019

(51) Int. Cl.
| | |
|---|---|
| *B60R 25/00* | (2013.01) |
| *G07C 9/00* | (2006.01) |
| *B60L 53/14* | (2019.01) |
| *B60L 53/16* | (2019.01) |
| *B60L 53/65* | (2019.01) |
| *B60L 3/12* | (2006.01) |
| *B60R 25/25* | (2013.01) |
| *H01R 13/639* | (2006.01) |

(52) U.S. Cl.
CPC ............ *G07C 9/00158* (2013.01); *B60L 3/12* (2013.01); *B60L 53/14* (2019.02); *B60L 53/16* (2019.02); *B60L 53/65* (2019.02); *B60R 25/252* (2013.01); *H01R 13/6397* (2013.01)

(58) Field of Classification Search
CPC .... G07C 9/00158; B60L 3/12; B60L 11/1816; B60L 11/1818; B60L 11/1846; B60R 25/252; H01R 13/6397

USPC ........................................................ 340/5.72
See application file for complete search history.

(56) References Cited

U.S. PATENT DOCUMENTS

| | | | |
|---|---|---|---|
| 9,352,652 B2 | 5/2016 | Montemayor Cavazos et al. | |
| 9,387,771 B1 * | 7/2016 | Shekher | B60L 11/1838 |
| 10,053,056 B1 * | 8/2018 | Zhang | B60R 25/25 |
| 2004/0255168 A1 * | 12/2004 | Murashita | G06K 9/00885 |
| | | | 726/5 |
| 2006/0055509 A1 * | 3/2006 | Teshima | B60R 25/252 |
| | | | 340/5.53 |
| 2008/0122577 A1 * | 5/2008 | Gutta | G07C 9/00158 |
| | | | 340/5.52 |
| 2008/0223926 A1 * | 9/2008 | Miller | G07C 9/00158 |
| | | | 235/382 |
| 2009/0219135 A1 * | 9/2009 | Harvey | B60R 25/2018 |
| | | | 340/5.82 |
| 2011/0034053 A1 * | 2/2011 | Matsumoto | B60L 3/0069 |
| | | | 439/304 |
| 2011/0109431 A1 * | 5/2011 | Bragagnini | G07C 9/00158 |
| | | | 340/5.52 |

(Continued)

*Primary Examiner* — Kerri L McNally
*Assistant Examiner* — Thang D Tran
(74) *Attorney, Agent, or Firm* — David B. Kelley; Brooks Kushman P.C.

(57) ABSTRACT

An electric vehicle (EV) charging system includes a receptacle on the EV and a controller. The controller may be configured to, responsive to a removal request and a discrepancy between a stored biometric record and first biometric data received from a first biometric sensor, compare the stored biometric record and second biometric data received from a second biometric sensor that is different from the first biometric sensor, and responsive to the comparison matching, generate an unlock request.

20 Claims, 5 Drawing Sheets

(56) References Cited

U.S. PATENT DOCUMENTS

| | | | |
|---|---|---|---|
| 2011/0193680 A1 | 8/2011 | Summerford et al. | |
| 2011/0227531 A1* | 9/2011 | Rajakaruna | B60L 3/0069 320/109 |
| 2012/0083148 A1* | 4/2012 | Hirashita | B60L 11/1818 439/304 |
| 2012/0268247 A1* | 10/2012 | Boot | B60L 3/12 340/5.83 |
| 2013/0021162 A1* | 1/2013 | DeBoer | B60L 11/1816 340/635 |
| 2013/0074985 A1* | 3/2013 | Ferguson | B67D 7/348 141/98 |
| 2013/0110296 A1* | 5/2013 | Khoo | G06F 1/26 700/286 |
| 2013/0179061 A1* | 7/2013 | Gadh | H02J 3/14 701/123 |
| 2013/0337669 A1 | 12/2013 | Najera et al. | |
| 2014/0002018 A1* | 1/2014 | Montemayor Cavazos | B60L 11/1818 320/109 |
| 2014/0070918 A1* | 3/2014 | Han | B60R 25/25 340/5.52 |
| 2014/0160280 A1* | 6/2014 | Rodr Guez | H04N 7/188 348/143 |
| 2015/0077054 A1* | 3/2015 | Uyeki | H02J 7/0052 320/109 |
| 2015/0304406 A1* | 10/2015 | Penilla | G01C 21/26 709/203 |
| 2015/0337571 A1* | 11/2015 | Henderson | E05B 85/16 701/49 |
| 2016/0068075 A1* | 3/2016 | Chen | B60L 11/1822 320/107 |
| 2017/0018129 A1 | 1/2017 | Huebner | |
| 2017/0108862 A1* | 4/2017 | Mikkelsen | B60W 30/09 |
| 2018/0105051 A1* | 4/2018 | Zheng | B60L 11/1824 |
| 2018/0186334 A1* | 7/2018 | Munafo | B60R 25/30 |
| 2018/0201187 A1* | 7/2018 | Yellambalase | B60Q 9/00 |
| 2018/0215280 A1* | 8/2018 | Lee | B60L 11/1816 |
| 2019/0027867 A1* | 1/2019 | Ognjanovski | H02J 7/0045 |

* cited by examiner

EV CHARGING CONNECTOR UNLOCK VIA BIOMETRIC INPUT

TECHNICAL FIELD

This disclosure relates to a charge cable and plug for an electric vehicle charge station and the corresponding charge receptacle on an electric vehicle (EV), and more particularly to a system and method for preventing unauthorized disengagement of the charging connector from a charging port on the EV.

BACKGROUND

Many electric vehicles (EVs) include a traction battery to store electric energy to provide vehicle propulsion and powering of electric systems. Often the EVs are configured to capture energy by vehicle systems (e.g., regenerative braking systems). Some EVs, such as battery electric vehicles (BEVs) and plug-in hybrid electric vehicles (PHEVs), include a receptacle that is configured to accept an electrical plug from which an electrical charge can be provided to the EV to charge the battery from the power grid.

SUMMARY

An electric vehicle (EV) charging system includes a receptacle on the EV and a controller. The controller may be configured to, responsive to a removal request and a discrepancy between a stored biometric record and first biometric data received from a first biometric sensor, compare the stored biometric record and second biometric data received from a second biometric sensor that is different from the first biometric sensor, and responsive to the comparison matching, generate an unlock request.

A method of unlocking an electric vehicle plug performed by a controller includes responsive to a disconnection request, comparing biometric data received from a first biometric sensor and a stored biometric record, responsive to a discrepancy in the comparison, comparing second biometric data, received from a second biometric sensor that is different from the first biometric sensor, with the stored biometric record, and responsive to the second biometric data comparison matching, unlocking the electric vehicle plug.

A charge station for an electric vehicle (EV) includes a plug having a first biometric sensor and configured to be coupled with the EV, and a controller. The controller may be configured to, responsive to detection of the plug coupled with the EV, engage a locking mechanism, responsive to a removal request and a match of a comparison between biometric data received from the first biometric sensor with a stored biometric record, disengage the locking mechanism, and responsive to the comparison not matching, activate a second biometric sensor that is different from the first.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Electric vehicles (EVs), whether implemented as plug-in electric vehicles (PHEVs) or as battery electric vehicles (BEVs), typically include a latching device on the EV charging receptacle (inlet port, socket, etc.), on the electric vehicle supply equipment (EVSE) charge cord (cable, wiring, and the like) connector (plug, jack, etc.), or a combination of the receptacle and the connector, as an attempt to prevent unintentional cord separation from the EV. As the vehicle charge cord is generally an expensive item, theft of the cord is also an issue in certain markets for PHEVs and BEVs. In addition, theft of electrical power (electricity) may occur at an EVSE charging station when an authorized user leaves the EV unattended and an unauthorized person attempts to charge their EV using electric power owned by, paid for, or coming from a source that is usually controlled by the authorized user. Some regions have adopted standards to lock the charge cord connector to the EV to prevent unauthorized persons from breaking the connection (i.e., disengaging the connector from the EV) and potentially stealing the charge cord from the EVSE, or using the charge cord for unauthorized charging of another EV (i.e., theft of electricity).

EV manufacturers have typically included either a mechanical device, such as a padlock, or an electromechanical device that can lock and unlock the EVSE connector to and from the EV. However, padlocks can be easily removed or defeated with tools such as bolt cutters and lock picks, such that the EVSE charge cord can be disconnected or stolen. Padlocks are also inconvenient for a user (e.g., customer, driver, owner, lessee, or other authorized person) to lock and unlock, especially in low illumination or inclement weather.

Electromechanical devices typically require a strategy for unlocking. One of the strategies used is to unlock the cord during any time that the EV doors are unlocked. Such a strategy may lead to un-intended EV charge stoppage when the user desires access to the EV.

Other conventional electromechanical device strategies have also been implemented. However, such other electromechanical device strategies may also be found inconvenient as the user is often required to perform an extra step (e.g., an additional press/push of an electronic key fob button) to remove the EVSE charge cord. Another conventional strategy for electromechanical devices uses key entry recognition when a button on a key pad that is on the EV, on the charge cord connector, or on the EVSE charging station is pressed. Additional hardware on the EV and software complexity is generally required for such strategies. The key pad/fob push button strategy can also be inconvenient for the user, especially if the cord connector unlock button is placed inside the EV cabin. Some EV manufacturers have included a dedicated cord connector unlock button on the key fob, which may be more convenient to the user, but generally adds a significant amount of cost and complexity for the EV manufacturers.

As noted above, conventional techniques at preventing unauthorized disconnection of the EVSE connector from the authorized user's EV such as using a physical key actuated mechanical lock, an electronic key fob signal, and the like can be inconvenient and bothersome to the authorized user. Thus, there is a need and desire for a robust and yet convenient system and method for preventing unauthorized disengagement of the EVSE connector from the charging port on the EV. The disclosure is directed to system and method embodiments to secure a charging connector on an electric vehicle supply equipment (EVSE) subsystem to a receptacle on an electric vehicle (EV) via biometric input. As detailed below and shown on the Figures, the embodiments generally provide improved technical effects that relate to securing the charging connector on the EVSE subsystem to the receptacle on the EV by reducing or preventing unauthorized disengagement of the connector from the receptacle.

A user is generally an authorized person having biometric characteristics (e.g., at least one of thumbprint/fingerprint, palmprint, retinal image, facial image, voice, voice and code words, etc.) and knowledge of one or more unique alpha and/or numeric character code(s) that have been previously approved for recognition and operation of the system 100. The thumbprint/fingerprint may be commonly referred to as a fingerprint. Further, as is understood by one skilled in the art, a biometric input device may include but is not limited to any biometric sensor/scanner/reader/input device (e.g., thumbprint/fingerprint/palmprint scanner, pressure sensitive pad, capacitive sensor matrix pad, facial recognition scanner, retinal image scanner, microphone, voice recognition and code words sensor, and the like), having operation and control processes implemented using an appropriate programmable controller (e.g., the controller 152). As used throughout herein, the term input device applies to devices that may be implemented to perform input functions, and such uses would be understood by one of skill in the art in view of the context of implementation and configuration as described.

Entry, approval, authentication, storage, retrieval, and the like of such biometric characteristics and unique access codes in a system such as the system 100 as described herein and shown on the Figures is understood by one skilled in the art. As detailed below and shown on the Figures, the embodiments generally provide improved technical effects that relate to securing the charging connector on the electric vehicle supply equipment (EVSE) subsystem to the receptacle on the EV by reducing or preventing unauthorized disengagement of the connector from the receptacle.

One or more biometric input devices 114 (e.g., the biometric device 174, the second biometric device 162, and the third biometric device 176) may be used to identify a specific authorized user (e.g., customer, driver, owner, operator, chauffer, lessee, or other authorized person) and provide for unlocking (e.g., release, disengagement, disconnection, etc.) of the cord connector 148. The biometric input devices 114, 174, 162, and 176 may use, but not be limited to a technological area or method such as thumb/finger print scanning, palm scanning, retinal recognition, iris recognition, facial recognition, voice recognition, voice and code word recognition, vein pattern recognition, ear shape recognition, etc.

Multiple user biometric information profiles (e.g., records, files, data, etc.) can be saved to (uploaded, stored in, etc.) and retrieved (e.g., downloaded, read, etc.) from memory that may be located in any module of the EV 102 (e.g., VCU 130 or charger 126), the charging station 142 (e.g., the memory 154), remote database(s), etc. alone or in combination, for comparison with biometric information that is presented to obtain authorization to unlock the connector 144. In one example, U.S. Published Application 2012/0268247, published, Oct. 25, 2012, which is incorporated by reference in its entirety, discloses a biometric identification information database of one or more authorized users for charging an EV.

As described below with regard to the Figures, the biometric devices 114, 174, 162, and 176 may be installed (located, mounted, positioned, fixed, fastened, etc.) on the electric vehicle (EV) 102 or on the cord set connector 144. Such biometric device may be used to identify a specific user and allow (e.g., authorize, permit, provide for, enable, etc.) unlocking of the connector 144, and thus the cable 148, from the charge port 120 on the EV 102.

In addition to reducing or preventing the theft of the costly charging cable 148 and plug 144 or the electricity from the charging station 142, embodiments may reduce overall system cost and part complexity of the EV 102 by elimination of the complex (i.e., added dedicated connector unlock button) key fob and/or an in-vehicle, dedicated connector unlock button as may be implemented in conventional approaches.

Embodiments of the disclosure may also simplify and speed up the separation of the charge cord 144 from the EV 102 operation (i.e., process, procedure, activity, etc.) by eliminating (i.e., deleting, removing, obviating, and the like) the conventional technology requirement for the user to perform the step of a secondary button push (entry) via a key fob or key pad.

With respect to issued patents and published patent applications, if any, that are incorporated by reference herein; one of skill in the art would understand that such references are only incorporated to the extent that they are exemplary of the types of technologies that may be implemented as referenced, and are not intended as limitations to or as mandatory to the embodiments of the disclosure.

Figure 1:
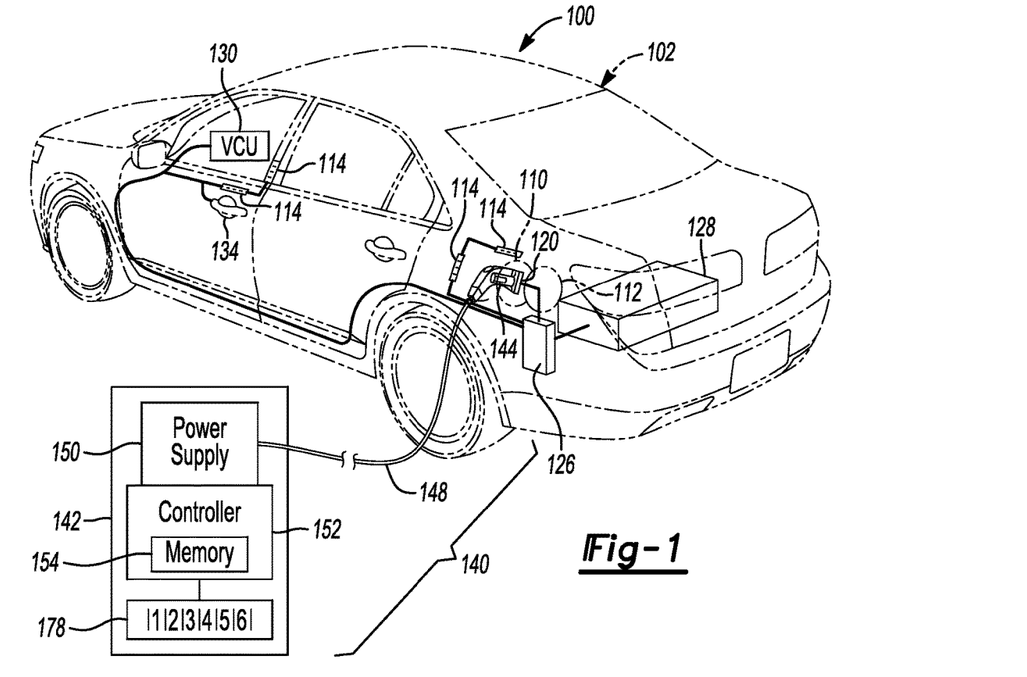
FIG. 1 is a schematic diagram illustrating an electric vehicle (EV) having a charge port and a biometric sensor located in several alternative positions on the EV, and an electric vehicle charging system (EVSE).

Referring to FIG. 1, a schematic diagram illustrating the EVSE connector lock system 100, the electric vehicle (EV) 102 (illustrated in phantom for clarity of illustration of other components), and the electric vehicle supply equipment (EVSE) subsystem 142 in accordance with one or more embodiments is shown. The system 100 comprises a system (e.g., a receptacle lock system) and associated method to secure the EVSE charging connector 144 to the receptacle 120 on the EV 102 via biometric input. FIG. 1 illustrates example embodiments of components, their associations, and positions. As one of skill in the art would understand, alternative components, associations, positions, and features may be implemented within the scope of the embodiments of the disclosure.

An EVSE system such as the EVSE 142 generally includes an electrical power supply subsystem (e.g., the charging station 142) that is electrically connected (e.g., coupled) to a large-scale power grid and to a computer controlled charger (e.g., electrical power source), that is, the power supply 150, which is electrically coupled to an electrically conducting cable (i.e., conductor, wiring, etc.), that is, the cable 148, which is terminated by a connector (i.e., plug, jack, etc.), that is, the plug 144. The connector 144 is configured to be detachably, matingly coupled (e.g., connected, plugged into, hooked up, inserted into, joined with, mated to, and the like) to a receptacle (e.g., port, charge port, input, jack, fitting, etc.), that is, the charge port 120, on the EV 102 such that the electrical energy storage device 128 can be recharged from the electrical power station 142 via a on board vehicle charger 126 (e.g., an AC-DC charger). Alternately, AC-DC charger 126 may reside in EVSE 152 (e.g. DCFC). The electrical cable 148 may include electrical conductors to provide two-way electrical communication between the charger controller 152, the connector 144, and the EV 102. Additionally, or alternatively, some or all communication between the charger controller 152, the connector 144, and the EV 102 may be implemented wirelessly via devices such as key fobs, cell phones, smart phones, and the like. The wireless connection may be performed using an industry standard wireless network such as Bluetooth, Wi-Fi, or a cellular network, or may use a propriety network.

The electric vehicle (EV) 102 may be implemented as a battery electric vehicle (BEV) or a plug-in hybrid electric vehicle (PHEV). The exterior of the EV 102 comprises the user door handle 134, a biometric input 114. The door handle 134 generally provides the user access to the interior (e.g., cabin) of the EV 102. The door handle 134 may be configured with a biometric sensor such that when grasped, the door handle 134 may identify an identity of the person grabbing the handle 134. A panel door 112 is generally implemented to close the body panel opening 110 (the closed position of the door panel is not shown for clarity of illustration).

The EV 102 may further comprises at least one instance of the biometric input device 114, the charge receptacle 120, the electrical storage device (e.g., battery) 128, the vehicle control unit (VCU) 130. While the electrical storage device 128 may be implemented as any appropriate electrical storage device or medium (e.g., one or more batteries, battery cells, battery packs, ultra capacitors, and the like) for convenience, the term battery 128 is generally used herein; however, such use is not a limitation of the energy storage device that may be implemented in the embodiments. Further, all embodiments of the system 100 need not require implementation of the VCU 130 as control may be distributed across multiple modules, or may reside in a different module (e.g., the on-board charger 126).

Further, as would be understood by one of skill in the art, the battery 128 is generally electrically coupled (connected) to one or more electric motors to provide tractive propulsion to the EV 102, and other electrically powered apparatuses, which for clarity, are not illustrated. Likewise, as is understood by one of skill in the art, the EV 102 is generally implemented having the vehicle control unit (VCU) 130, in some embodiments where implemented, electrically interconnected with (e.g., electrically coupled to) all implementations of the biometric input device 114, the second biometric input device 162, the third biometric input device 176, the receptacle 120, and the battery 128.

The input device 114 is generally accessible and operable by the user from outside of the EV 102. The input device 114 may be implemented as a biometric input device (e.g., sensor, reader, scanner, microphone, pressure sensitive pad, capacitive sensor matrix, etc.) that, under the control of a controller (e.g., 126 or 130), obtains (e.g., acquires, reads, scans, etc.) biometric information from the user. In one or more embodiments, the biometric input device 114 may be positioned (e.g., mounted, located, etc.) on an outer surface of the EV 102 proximate (i.e., near, adjacent, close to, within easy reach of, etc. as understood by one skilled in the art) the body panel opening 110 to provide the user easy (e.g., ready, unencumbered, direct, etc.) access to the input device 114 during a recharging process. The biometric input device 114 may be positioned at a distance less than 0.5 m., and more often less than 0.25 m. from the body panel opening 110. Electrical communication generally includes signal and power communication and transference, and may include multiple instances of wiring (e.g., a wiring bundle with multiple branches) within a cable.

Figure 5:
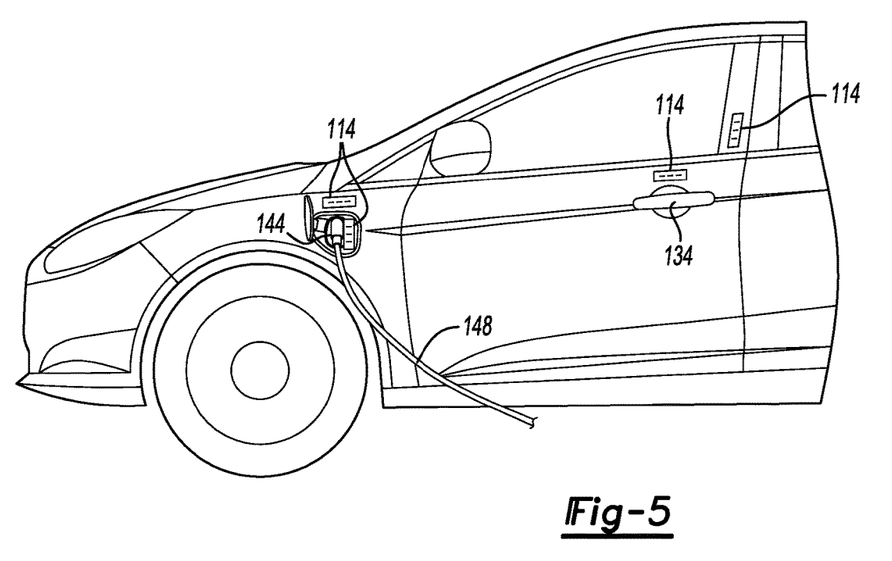
FIG. 5 is a schematic diagram illustrating a biometric sensor in vicinity of the charge port, and alternative locations for the biometric sensor on the vehicle.

While the body panel opening 110, the panel door 112, and some instances of the input device 114 are illustrated as placed in the left, rear area of the EV 102, the embodiments are not limited to placement of the first input device 114 only to that location. In other embodiments such as illustrated in FIG. 5, the biometric input device 114 may be placed on the EV 102 proximate to the receptacle 120, on a front quarter panel or a door panel near the user door handle 134, on a "B" pillar or integrated within the door handle 134. The biometric input device 114 may be positioned at a distance less than 0.25 m., and more often less than 0.1 m. (i.e., 10 cm.) from the receptacle 120 or the user door handle 134.

The charge receptacle 120 is generally positioned (e.g., mounted, located, etc.) within the EV 102, interior to the body panel opening 110 (i.e., below the outer surface of the EV 102). The charge receptacle 120 is generally accessible by the user from outside of the EV 102 when the panel door 112 is in an open position. As discussed below with regard to FIG. 2, the receptacle 120 is sized and shaped to mechanically and electrically couple (e.g., mate, connect, etc.) with the plug 144.

The biometric input device 114 is generally in electrical communication with (i.e., electrically coupled to) the charge port 120 via an electrical interconnect cable. The biometric input device 114 is generally in electrical communication with (i.e., electrically coupled to) the VCU 130 via the first electrical interconnect cable. The charge receptacle 120 is in electrical communication with (i.e., electrically coupled to) the VCU 130 via the first electrical interconnect cable. The VCU 130 is also in electrical communication with the battery 128 via the first cable. The receptacle 120 may be directly electrically coupled to the battery 128 via the first electrical interconnect cable. In other alternative embodiments (not illustrated), the receptacle 120 may be electrically coupled to the battery 128 via a charge input module that may be configured to perform filtering, buffering, and the like.

The EVSE 142 has a power supply 150, the electrical charging station 142, the electrical charging connector 144, and an electrical interconnect cable (i.e., charging cable) 148. The electrical charging station 142 is in electrical communication with (i.e., electrically coupled to) the electrical charging connector 144 via the cable 148. That is, the cable 148 is terminated by the connector 144. As understood by one of skill in the art, the electrical charging station 142 is generally also in electrical communication with (i.e., electrically coupled to) an electrical power source such as an electrical power grid, solar cell array, wind power generator array, and the like, which for clarity, is not illustrated. In one embodiment, the EVSE requires the operator to supply cord 148 and connector 144 (e.g., some embodiments of L1 charging). Also, in some embodiments, the charge station 142 may be a fixed charger (AC or DCFC) or a portable charger cord 148. The portable charger cord 148 includes the functionality of the charge station 142, and in some embodiments, the charge station 142 is implemented in part in both the portable charger cord 148 and a module of the vehicle 102 (e.g., charger 126).

The charging station 142 includes a power supply 150 and a controller 152 which includes (i.e., is generally directly electrically internally coupled to) the memory 154. The controller 152, in electrical connection the memory 154, may be generally configured to control the operation of the lock system 100 via computer programming (e.g., executable instructions), and instructions from the user. The charging station 142 may further include a biometric sensor/ keypad 178 that may be used to unlock the connector 144 from the EVSE 142 allowing it to be coupled with the vehicle 102. Upon coupling the connector 144 with the vehicle 102 communication may occur via the electrical cable 148, or via a wireless connection.

As is understood by one skilled in the art, the controller 152 (e.g., processor) as disclosed herein generally comprises one or more of a programmable (e.g., programmed) computer processing unit (i.e., CPU, microprocessor, etc.); the memory 154 may be either volatile (e.g., RAM, SRAM, etc.) or non-volatile memory (e.g., ROM, FLASH memory, etc.) or may be of any physical manufacture including standalone memory devices, and may include sections where stored data, information, programming, records, files, and the like is non-transitory (persistent) and, alternatively, transitory (non-persistent); analog and digital input and output (i.e., interface, I/O, etc.) devices; firmware; logic circuitry; and software (i.e., program(s)). The electrical and electronic devices that comprise the controller 152 and the memory 154 are generally in electrical communication (e.g., electrically coupled via wiring or, alternatively, wirelessly) with each other and with peripheral devices and apparatuses (e.g., sensors, actuators, I/O devices, etc.) external to the processor. The controller 152 generally performs operations (e.g., methods, routines, steps, processes, control, and the like) in accordance with instructions provided in the program(s) (e.g., programming to control, executable instructions, and the like), and manually by the user. The operations performed by the controller 152 and associated apparatuses, assemblies, subassemblies, components, etc. may be shown and described by way of text, flow chart, graphical (e.g., figures, plots, etc.), tabular, etc. representation, and by any combination thereof. The controller 152 may be implemented as a standalone unit, or alternatively, as distributed subassemblies. The configuration of the controller 152 and associated devices is generally selected (chosen, procured, adapted, modified, etc.) as appropriate to the design criteria of a particular implementation, as would be readily comprehended by one of skill in the art.

As is understood by one of skill in the art, the VCU 130 may be implemented similarly to the controller 152. The VCU 130 may comprise additional components and features that provide control, monitoring, sensor input and actuator output processing, communication, and the like related to additional components, assemblies, subassemblies, and the like that are implemented in the EV 102. Some of the control aspects of controller may be shared or distributed to controllers in the vehicle 102 (e.g., in the charger 126, the VCU 130, or other control system in the vehicle) or may be remote from the EVSE 142, (e.g., remote server, remote controller). For example, the EVSE 142 may connect with a remote controller (e.g., remote server, cell phone, table, etc.) via a wireless connection such that the biometric Referring to FIG. 2, a schematic diagram illustrating a left side view of the charge port 120 on the EV 102 and within the body panel opening 110, and the left side of the electrical plug 144 in accordance with one or more embodiments is shown. The connector 144 generally includes the housing 160, the cable 148, the latch arm 166, the finger/thumb key/biometric sensor (reader) input device 174, a connector handle biometric sensor (i.e., the second input) device 162, and an alternative biometric sensor 176 on the handle 178 of the plug 144.

Figure 2:
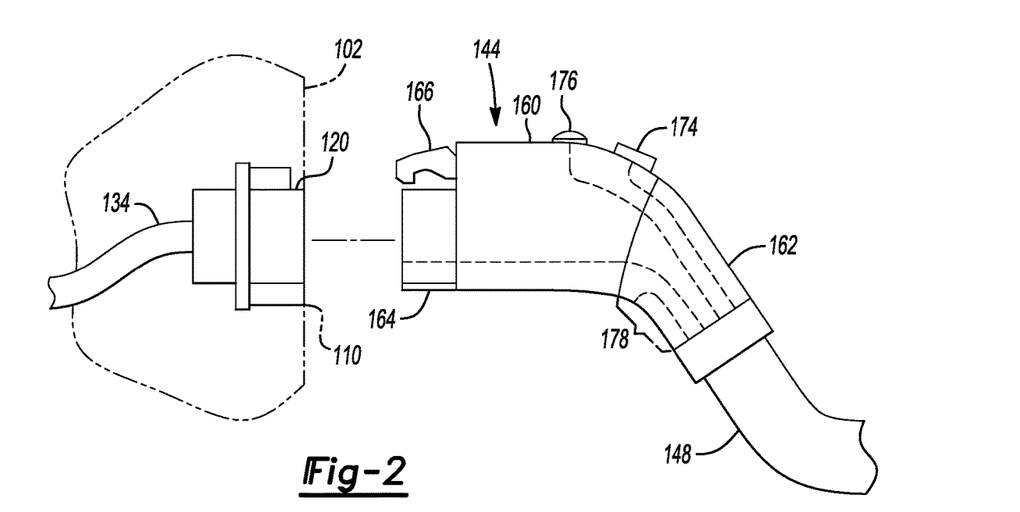
FIG. 2 is a schematic diagram illustrating the charge port of the EV, and a side of the electrical plug.

The housing 160 further comprises and is generally configured to mechanically define and position the connector handle (i.e., the second input) device 162 and the nose section 164; and mechanically hold and position the latch arm 166 and the finger/thumb key/biometric sensor (reader) input device 174. The rear of the housing 160 provides a mechanical interface between the connector 144 and the cable 148 (i.e., charging connector-to-charging station). Typically, the sensors (e.g., 114, 162, 174, and 176) are coupled with controller 152 via electrical wires within the cable 148.

As well as providing a biometric sensor (e.g., a finger/ palmprint reader), the handle section 178 of the housing 160 generally provides a handle region for the user to grasp and manipulate the plug 144. For example, the second biometric sensor 162 may be integrated with or affixed on the handle section 178 of the housing 160 of the connector 144. The nose section 164 includes connector terminals (not illustrated for clarity) and is sized and shaped to couple mechanically and electrically with the charge port 120. The latch arm 166 is sized and shaped to couple mechanically with the charge port 120 and lock the connector 144 to the receptacle 120. Some details of the mechanical and electrical coupling, and latching between the receptacle 120 and plug 144 may be implemented similarly to the EV connector to receptacle mechanism as shown and described, for example, in U.S. Pat. No. 8,075,329, issued Dec. 13, 2011, which is incorporated by reference in its entirety. Likewise, in another embodiment, some details of the mechanical and electrical coupling, and latching between the receptacle 120 and plug 144 may be implemented similarly to the EV connector to receptacle mechanism as shown and described, for example, in U.S. Pat. No. 8,932,072, issued Jan. 13, 2015, which is also incorporated by reference in its entirety. While illustrated as a hooked tang on the latch arm 166 that latches to the receptacle 120, in alternative embodiments (not illustrated), the latching mechanisms between the electrical charging connector 144 and the EV 102 may be implemented having any other physically secure lock mechanism controlled via the controller 152, as would be understood by one of ordinary skill in the art. In other embodiments, the latch arm 166 or latching mechanism may reside on the vehicle 102 and may be configured to secure the nose section 164 of the plug 144.

The second biometric input device (e.g., a finger/palmprint reader/sensor) 162 is generally positioned (e.g., integrated) on the rearward or handle section of the connector housing 160 to provide robust sensory input as well as convenient finger and hand manipulation access to the user.

The third input device 176 is positioned at the top of the housing 160 to provide convenient access to the user for a thumb or finger manipulation to provide open access to voice or images. The third input device 176 may be biometric fingerprint reader, microphone, camera, or a combination switch/sensor. Also, an embodiment of the third input device 176 may be implemented as a combination key and biometric sensor/reader device. The third biometric input device 176 may be implemented as a key/push button that includes a biometric sensor device as shown and described, for example, in U.S. Pat. No. 9,352,652, issued May 31, 2016, which is incorporated by reference in its entirety, and in particular, on FIG. 4 and at col. 6, line 61—col. 7, line 9. As would be understood by one of skill in the art, the third input device 176 may be implemented having any suitable biometric sensor/reader device. This input device may also be a microphone that is configured to convert sound waves into an electrical signal. The electrical signal may be processed to produce a voice signature of the recorded sound. For example, the electric signal may be processed using a Fourier Transform to convert the time domain signal to a frequency domain signal and the energy at specific frequencies. Based this output may be compared with pre-stored data and if it is within a specific tolerance, the controller will indicate a match. If the comparison has differences greater than the specific tolerances, the controller will indicate a discrepancy. Further to improve accuracy, the use of a voice signature of a code word may increase the reliability of the match. Also the use of a retinal eye scan, or facial recognition may be used.

The input devices 114, 162, 174, and 176 are generally electrically coupled to the controller 152 via a conductor or via a wireless connection. Also, the input devices 114, 162, 174, and 176 may be electrically coupled to other controllers (e.g., 126, 130) in the vehicle 102 or modules of the vehicle 102. Also, the systems The use of different biometric input devices allows different configurations and different ways to provide authentication. For example, in one embodiment, the one of the biometric input devices 114, 162, 174, or 176 is a primary device and a different biometric input devices 114, 162, 174, or 176 is a secondary device. Here, the primary input device may be used to provide authentication, and if that fails, a user would need to provide input via the secondary input device. For example, if the thumb/fingerprint reader was the primary input device, if that input failed, then the user would need to provide authentication via the secondary input device (e.g., a palmprint or voice signature). In some embodiments, matching data from both the primary and secondary input device would be needed after a first failure, while in other embodiments, just data from the secondary input device would be needed after the failure. In another embodiment, if the second authentication failed using data from the secondary input device, then matching data from the third input device would be needed. Similar to the use of the secondary input device, matching data from the third input device may be needed. Also, along with multiple tiers of matching biometric data, authentication or overriding may be performed using an in-vehicle system (e.g., infotainment system, instrument cluster, steering wheel control buttons, driver information console, or other vehicle module with a human interface) or via a remote connection with an authentication server (e.g., an original equipment manufacturer (OEM) server).

As such, one of skill in the art would understand, while the controller 152 may be described as controlling the system 100 in response to programming and/or data stored in non-transitory sections of the memory 154, stored in transitory sections of the memory 154, and instructions received from the user, as the system 100 is an interconnected system, signals, data, information, instructions, and the like related to the operation and control of the system 100 may be shared and communicated between any of the controllers (e.g., 126, 130, or 142) and the associated components (e.g., the input devices 114, 162, 174, or 176) via a conductor or wirelessly. Electrical communication for monitoring and control may be implemented, for example, by a communication mechanism known in the field (e.g., Local Interconnect Network (LIN), Controller Area Network (CAN), Ethernet, etc.).

Figure 3:
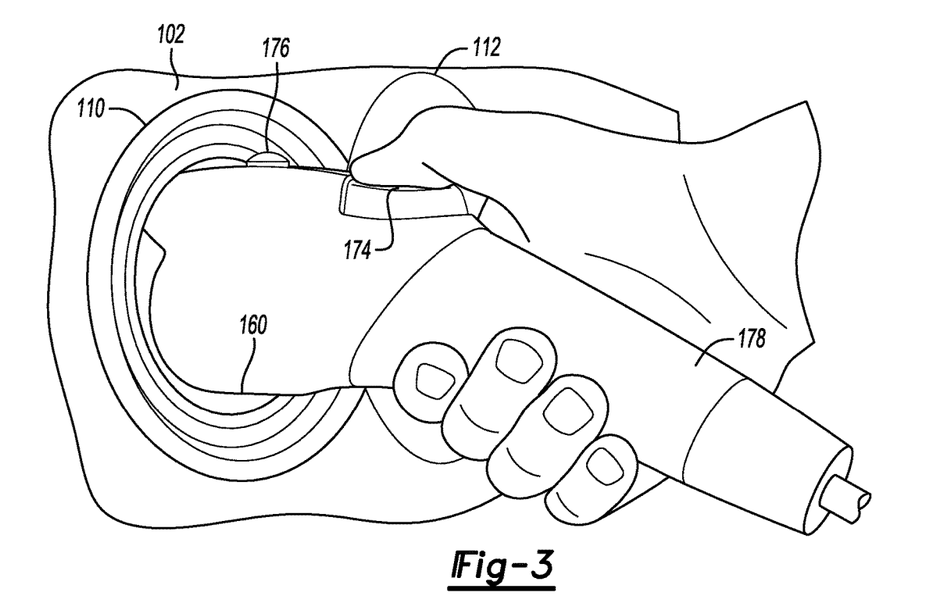
FIG. 3 is a schematic diagram illustrating a hand gripping an electrical plug.

Referring to FIG. 3, a schematic diagram illustrating an implementation of the electrical plug 144 connected to the EV 102 in the charge port 120, and as generally held by the user is shown. The electrical plug 144 includes the biometric push button device 174, the alternative biometric device 176, and the handle biometric sensor 178.

Figure 4:
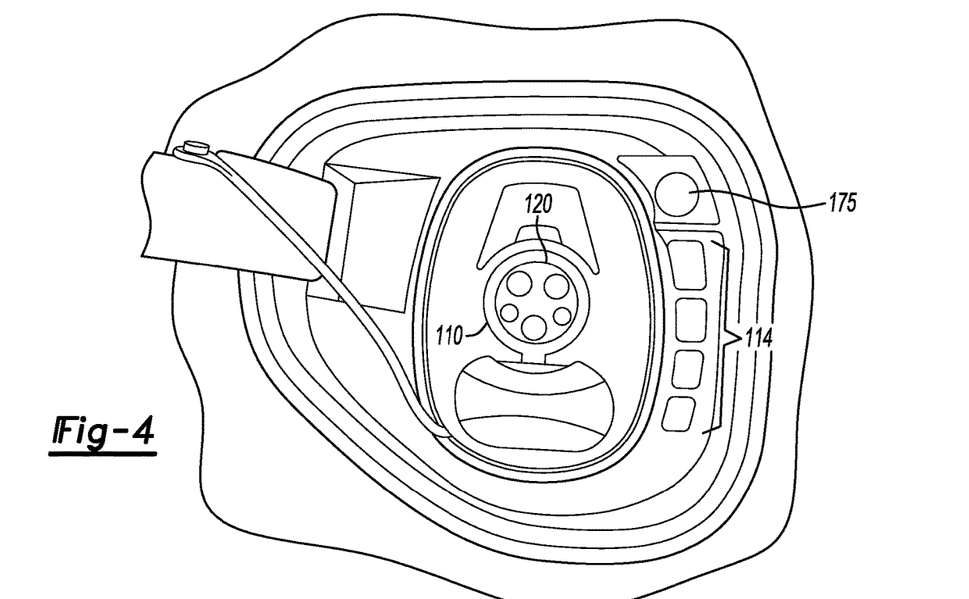
FIG. 4 is a schematic diagram illustrating a charge receptacle for the EV.

Referring to FIG. 4, a schematic diagram illustrating implementation of the first input device (e.g., the biometric sensor) 114 is shown. The input device 114 is illustrated mounted on the EV 102 in vicinity of the receptacle 120 in accordance with one or more embodiments. The panel door is illustrated in the open position. In the open position, the panel door provides access through the body panel opening 110 to the biometric sensor 114 and to a door latch mechanism 175. In the closed position, the panel door provides protection for the biometric sensor 114 and the receptacle 120. The biometric sensor 114 may also include a display to illustrate a state of charge of the battery or illustrate a design pattern or numbers that may be associated with a code used along with the biometric sensor reading.

Referring to FIG. 5, a schematic diagram illustrating implementations of the biometric device (e.g., the input device) 114 is shown. The biometric device 114 is illustrated mounted beside (i.e., proximate to, near, in close vicinity to, nearly adjacent) the charge port 120 beneath the outer surface of the EV 102 and behind the door panel when the door panel is in the closed position (not illustrated), in accordance with one or more embodiments. For clarity, the panel door is illustrated in the open position which provides the user access through the body panel opening 110 to the receptacle 120 and to the biometric device 114. Additionally, at multiple, or alternative, locations of the biometric device 114 include on a body panel of the EV 102 in vicinity of the charge port 120, on a door panel of the EV 102 near the door handle 134, on a body panel of the EV 102 in vicinity of the door handle 134, and integrated with the door handle 134. The connector 144 is illustrated plugged in (e.g., coupled) to the EV 102.

Referring to FIGS. 1-5 collectively, the receptacle 120 is configured to matingly receive the connector 144. Insertion of the nose section 164 of the connector 144 into the receptacle 120 is generally performed by the user, and, under control of the controller 152, generally results in the locking of the connector 144 into the receptacle 120 via the latch arm 166 or by some other securing mechanism (e.g., screw lock, actuated quick disconnect fitting, etc.). Insertion of the connector 144 into the receptacle 120 generally provides electrical communication between the EV 102 and all associated electrical apparatuses and devices, including the VCU 130, and the charging station 132 (e.g., the controller 152) and completes directly coupled electrical communication throughout the system 100. Further, as would be understood by one of skill in the art, regardless of electro-mechanical connection between the receptacle 120 and the connector 144, the EV 102 and associated electrical components and the EVSE 142 may also wireless communicate with each other, and with user operated devices such as electronic key fobs, remote controls, cell phones, smart phones, and the like.

Figure 6:
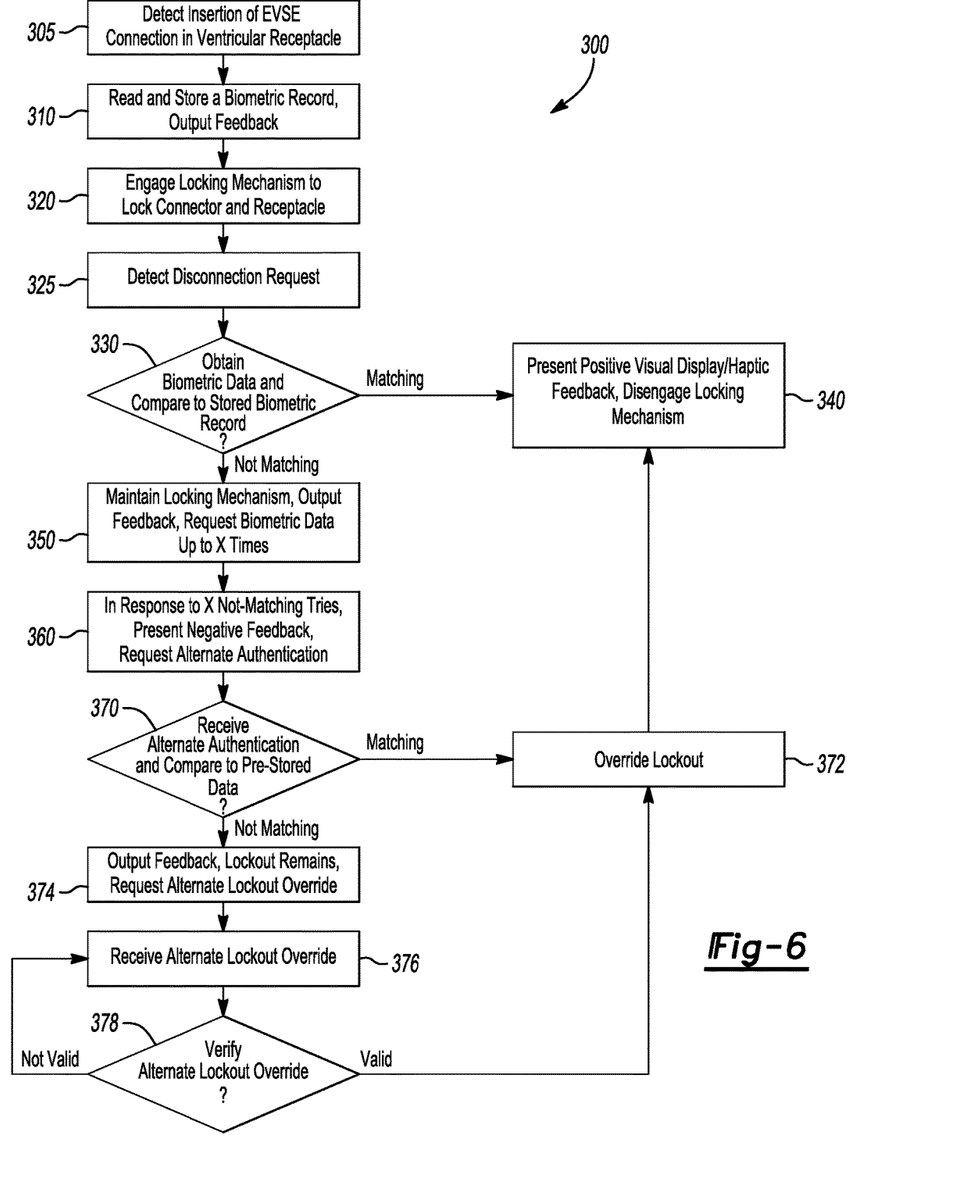
FIG. 6 is a flow diagram for a biometric unlocking mechanism for an electrical vehicle charge system.

FIG. 6 is a flow diagram illustrating a biometric unlocking method 300 for preventing unauthorized disengagement between the electrical plug 144 and the charge port 120 on the electric vehicle 102 in accordance with one or more embodiments is shown. The biometric unlocking method 300 generally comprises the steps (e.g., blocks, operations, and the like) 305, 310, 320, 325, 330, 340, 350, 360, 370, 372, 374, 376, and 378 which are generally performed by a controller (e.g. controller 126, 152, 130, etc.) via software (programming) stored in a non-transitory manner in the memory (e.g., memory 154). In some embodiments, the memory may be in vehicular modules (e.g., 126, and 130). However, some steps to the method 300 may be performed in accordance with information (e.g., data, records, and the like) that is stored to and retrieved from transitory sections of the memory 154. Further, some steps to the method 300 may be performed in accordance with information (e.g., data, records, and the like) and instructions that are obtained from the user.

The lock system 100 is intended to prevent unauthorized disengagement between the electrical plug 144 and the charge port 120 on the electric vehicle 102 in accordance with one or more embodiments as described. Using the lock system 100 generally comprises a method (e.g., steps, routines, actions, operations, and the like) generally performed under the control of the controller 152 via software (programming) stored in a non-transitory manner in the memory 154 and, in some instances, steps performed by the user. However, some steps of the method may be performed in accordance with information (e.g., data, records, and the like) that is stored to and retrieved from transitory sections of the memory 154. Further, some steps are generally performed in accordance with information (e.g., data, records, and the like), actions, and instructions that are obtained from the user.

Prior to recharging the battery 128, the user will generally have generated and stored (uploaded) a database of stored biometric records (e.g., stored records, archived records, and the like). The database may be in the memory 154 or another memory that is accessible by the controller 152. The stored biometric records contain biometric information associated with the user and with the biometric device 114, the second biometric device 162, and the third biometric device 176 such that the controller 152, at a later time, may use (e.g., download, retrieve, read, etc.) the stored biometric records for determination as to unlocking the connector 144 from the receptacle 120. The stored biometric records may be generated using the system 100 via the controller 152 and programming resident in the memory 154.

Also, prior to performance of the lock method associated with the lock system 100, the user will generally have stored in the memory 154 or other memory that is accessible by the controller 152, one or more valid codes (e.g., a pre-stored code comprising alphanumeric characters or the like) which may provide an alternative technique to unlock the connector 144 from the receptacle 120, e.g., to override (e.g., disable, deactivate, etc.) a lockout condition (e.g., a condition wherein the lock system 100 prevents unlocking the connector 144 from the receptacle 120). Further, embodiments of the lock system 100 may implement alternative activities to unlock the connector 144 from the receptacle 120 such as a valid signal presented by an electronic key fob, telephone, testing diagnostics and repair instruments, or the like; or a mechanical key and lock apparatus (e.g., a hard lock).

At a time that the user wishes to recharge the battery 128, the user generally inserts the charging connector 144 into the receptacle 120. As noted above with regard to FIGS. 1-5, under control of (e.g., in response to programming stored in the memory 154, instructions, and the like) the controller 152, the connector 144 becomes locked into the receptacle 120. In operation 305, a controller detects the insertion of a charge plug 144 in a receptacle 120 of the vehicle. The detection may be automatically triggered (e.g., based on establishment of a connection between the EVSE station and vehicle), or manually triggered (e.g., based on a signal from a push button such as biometric sensor/button 174). Then in operation 310, the controller reads and stores a biometric record of the biometric signature associated with the coupling of the plug 144 and the receptacle 120. For example, the biometric sensor may include a finger/thumb print (e.g., from sensor 174), a palmprint or handprint (e.g., from sensor 178), or a voice signature (e.g. from sensor 176). In operation 320, a locking mechanism is engaged, that locking mechanism may be the latching mechanism 166 or other locking structure to secure the plug 144 with the receptacle 120.

At a time the user wishes to disengage the connector 144 from the receptacle 120, such as operation 330, the controller obtains biometric data from the sensor and compares the data with pre-stored biometric data associated with the vehicle 102. The acquisition of the biometric data may be automatically performed by the controller (e.g., based on an interrupt driven event or via a polling algorithm) or the capture of biometric data may be manually based on an event, such as depression of a push button (e.g. button/sensor 174). Then at least one biometric information record (e.g., a re-obtained biometric record) using at least one of the system 100 biometric input devices (e.g., the biometric device 114, 174, 176, or 178). If the biometric data matches the pre-stored biometric data, the controller will branch to operation 340 and unlock the locking mechanism and output feedback such as a green light or haptic feedback indicating the connection is unlocked. If the data does not match, the controller will branch to operation 350.

The process implemented by the user to generate the re-obtained record may be the same as or similar to the process implemented to generate the stored biometric record. For example, in an embodiment, the user may press a thumb or one or more fingers on the biometric input device 114 such that under control of the controller, the thumb/fingerprint reader implementation of the first input device 114 generates a re-obtained record that comprises a finger/palmprint scan or pressure image of the user digits. In another example embodiment, the user may grasp the connector 144 such that under control of the controller, the connector handle finger/palmprint reader 178 generates a re-obtained record that comprises a finger/palmprint scan or pressure image of the user hand. In another embodiment, the user may grasp the connector 144 such that under control of the controller, the finger/thumb biometric sensor 176 generates a re-obtained biometric record that comprises a finger/thumbprint scan or pressure image of the user digit. As would be understood by one of skill in the art, other re-obtained biometric records may be generated in similar manners appropriate for the particular implementation of a biometric sensor. Further, in operation 360 the controller may request an alternate authentication. Here, for example, the controller may require both a matching thumb/fingerprint and a matching hand/palm print, or a matching voice signature and fingerprint or use of a voice signature of a code word and a matching finger print or a matching hand/palm print.

In response to the user re-obtaining a biometric record (e.g., the re-obtained biometric record); the controller may compare the re-obtained biometric record with the stored biometric record (e.g., as read from the memory 154) to determine that the re-obtained biometric record is matching the stored biometric record, or alternatively, is not matching the stored biometric record.

In response to the controller determining the re-obtained biometric record is matching the stored biometric record, under control of the controller, the connector 144 is unlocked. The user generally removes (disengages) the connector 144 from the receptacle 120.

In response to the controller determining the re-obtained biometric record is not matching the stored biometric record, such as in operation 370, the controller may maintain the lockout condition (e.g., state, mode, etc.) such that the connector 144 remains locked in the receptacle 120.

In operation 374, upon noticing or, alternatively, receiving notification from the system 100, that the system 100 is in the lockout condition, the user will generally pursue a lockout override. The lockout override may include an electronic key fob signal, a signal from an in-vehicle push button, an override command presented via a key pad, phone, smart phone, and the like, via testing and diagnostics devices, a physical key actuated mechanical lock, and the like.

In response to the system 100 receiving the lockout override, the controller 152 unlocks the connector 144, and the user may disengage (remove, unplug, etc.) the connector 144 from the receptacle 120. Otherwise, the system 100 generally remains in the lockout condition, i.e., the connector 144 generally remains locked in the receptacle 120.

Figure 7:
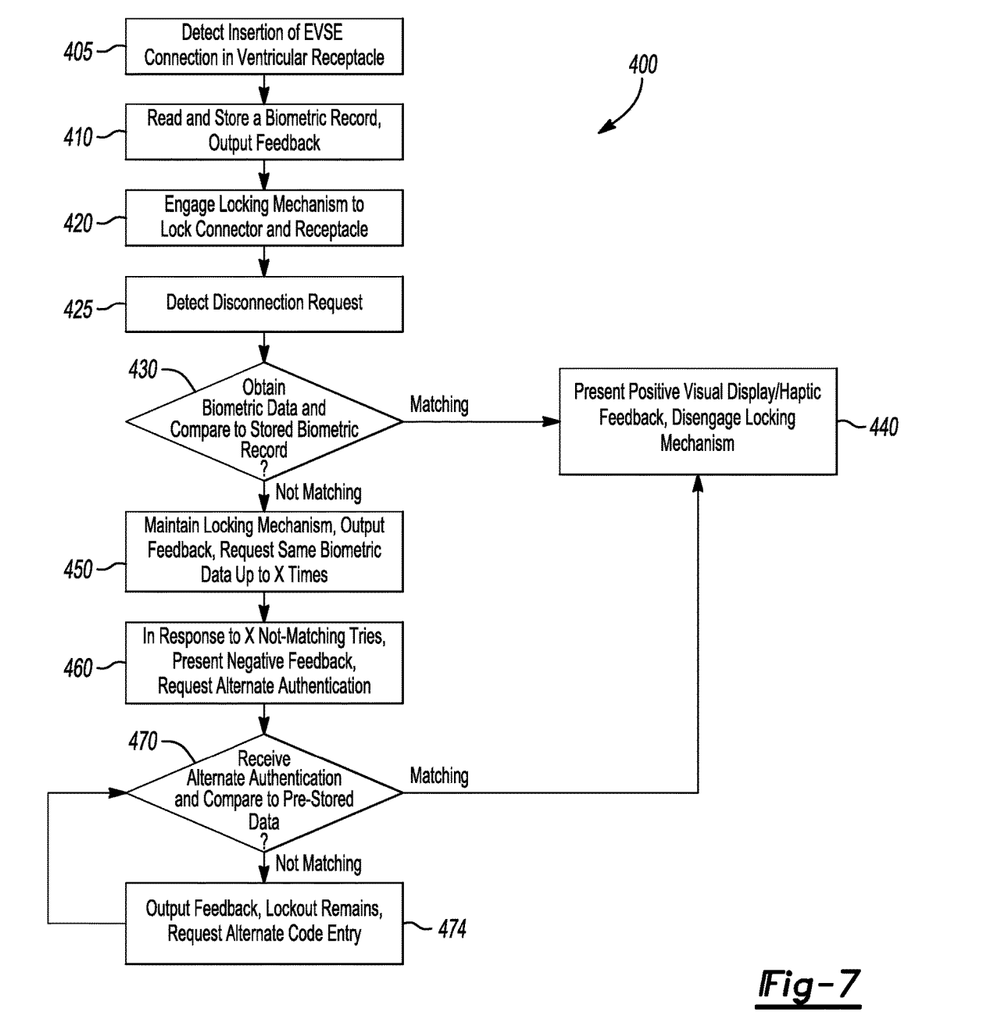
FIG. 7 is a flow diagram for a biometric unlocking mechanism for an electrical vehicle charge system.

FIG. 7 is a flow diagram illustrating a simplified biometric unlocking method 400 for preventing unauthorized disengagement between the electrical plug 144 and the charge port 120 on the electric vehicle 102 in accordance with one or more embodiments is shown. The biometric unlocking method 400 generally comprises the steps (e.g., blocks, operations, and the like) 405, 410, 420, 425, 430, 440, 450, 460, 470, and 474 which are generally performed by a controller (e.g. controller 126, 152, 130, etc.) via software (programming) stored in a non-transitory manner in the memory 154. However, some steps to the method 400 may be performed in accordance with information (e.g., data, records, and the like) that is stored to and retrieved from transitory sections of the memory 154. Further, some steps to the method 400 may be performed in accordance with information (e.g., data, records, and the like) and instructions that are obtained from the user.

The lock system 100 is intended to prevent unauthorized disengagement between the electrical plug 144 and the charge port 120 on the electric vehicle 102 in accordance with one or more embodiments as described. Using the lock system 100 generally comprises a method (e.g., steps, routines, actions, operations, and the like) generally performed under the control of the controller 152 via software (programming) stored in a non-transitory manner in the memory 154 and, in some instances, steps performed by the user. However, some steps of the method may be performed in accordance with information (e.g., data, records, and the like) that is stored to and retrieved from transitory sections of the memory 154. Further, some steps are generally performed in accordance with information (e.g., data, records, and the like), actions, and instructions that are obtained from the user.

Prior to recharging the battery 128, the user will generally have generated and stored (uploaded) a database of stored biometric records (e.g., stored records, archived records, and the like). The database may be in the memory 154 or another memory that is accessible by the controller 152. The stored biometric records contain biometric information associated with the user and with the biometric device 114, the second biometric device 162, and the third biometric device 176 such that the controller 152, at a later time, may use (e.g., download, retrieve, read, etc.) the stored biometric records for determination as to unlocking the connector 144 from the receptacle 120. The stored biometric records may be generated using the system 100 via the controller 152 and programming resident in the memory 154. In some embodiments, unauthorized biometric storage may be prevented by requiring presence of key-fob during data storage.

Also, prior to performance of the lock method associated with the lock system 100, the user will generally have stored in the memory 154 or other memory that is accessible by the controller 152, one or more valid codes (e.g., a pre-stored code comprising alphanumeric characters or the like) which may provide an alternative technique to unlock the connector 144 from the receptacle 120, e.g., to override (e.g., disable, deactivate, etc.) a lockout condition (e.g., a condition wherein the lock system 100 prevents unlocking the connector 144 from the receptacle 120). Further, embodiments of the lock system 100 may implement alternative activities to unlock the connector 144 from the receptacle 120 such as a valid signal presented by an electronic key fob, telephone, testing diagnostics and repair instruments, or the like; or a mechanical key and lock apparatus (e.g., a hard lock).

At a time that the user wishes to recharge the battery 128, the user generally inserts the charging connector 144 into the receptacle 120. As noted above with regard to FIGS. 1-5, under control of (e.g., in response to programming stored in the memory 154, instructions, and the like) the controller 152, the connector 144 becomes locked into the receptacle 120. In operation 405, a controller detects the insertion of a charge plug 144 in a receptacle 120 of the vehicle. The detection may be automatically triggered (e.g., based on establishment of a connection between the EVSE station and vehicle), or manually triggered (e.g., based on a signal from a push button such as biometric sensor/button 174). Then in operation 410, the controller reads and stores a biometric record of the biometric signature associated with the coupling of the plug 144 and the receptacle 120. For example, the biometric sensor may include a finger/thumb print (e.g., from sensor 174), a palmprint or handprint (e.g., from sensor 178), or a voice signature (e.g. from sensor 176). In operation 420, a locking mechanism is engaged, that locking mechanism may be the latching mechanism 166 or other locking structure to secure the plug 144 with the receptacle 120.

At a time the user wishes to disengage the connector 144 from the receptacle 120, such as operation 430, the controller obtains biometric data from the sensor and compares the data with pre-stored biometric data associated with the vehicle 102. The acquisition of the biometric data may be automatically performed by the controller (e.g., based on an interrupt driven event or via a polling algorithm) or the capture of biometric data may be manually based on an event, such as depression of a push button (e.g. button/sensor 174). Then at least one biometric information record (e.g., a re-obtained biometric record) using at least one of the system 100 biometric input devices (e.g., the biometric device 114, 174, 176, or 178). If the biometric data matches the pre-stored biometric data, the controller will branch to operation 440 and unlock the locking mechanism and output feedback such as a green light or haptic feedback indicating the connection is unlocked. If the data does not match, the controller will branch to operation 450.

The process implemented by the user to generate the re-obtained record may be the same as or similar to the process implemented to generate the stored biometric record. For example, in an embodiment, the user may press a thumb or one or more fingers on the biometric input device 114 such that under control of the controller, the thumb/fingerprint reader implementation of the first input device 114 generates a re-obtained record that comprises a finger/palmprint scan or pressure image of the user digits. In another example embodiment, the user may grasp the connector 144 such that under control of the controller, the connector handle finger/palmprint reader 178 generates a re-obtained record that comprises a finger/palmprint scan or pressure image of the user hand. In another embodiment, the user may grasp the connector 144 such that under control of the controller, the finger/thumb biometric sensor 176 generates a re-obtained biometric record that comprises a finger/thumbprint scan or pressure image of the user digit. As would be understood by one of skill in the art, other re-obtained biometric records may be generated in similar manners appropriate for the particular implementation of a biometric sensor. Further, in operation 460 the controller may request an alternate authentication. Here, for example, the controller may require both a matching finger/thumb print and a matching hand/palm print, or a matching voice signature and finger/thumb print or use of a voice signature of a code word and a matching finger/thumb print or a matching hand/palm print.

In response to the user re-obtaining a biometric record (e.g., the re-obtained biometric record); the controller may compare the re-obtained biometric record with the stored biometric record (e.g., as read from the memory 154) to determine that the re-obtained biometric record is matching the stored biometric record, or alternatively, is not matching the stored biometric record.

In response to the controller determining the re-obtained biometric record is matching the stored biometric record, under control of the controller, the connector 144 is unlocked. The user generally removes (disengages) the connector 144 from the receptacle 120.

In response to the controller determining the re-obtained biometric record is not matching the stored biometric record, such as in operation 470, the controller may maintain the lockout condition (e.g., state, mode, etc.) such that the connector 144 remains locked in the receptacle 120.

In operation 474, upon noticing or, alternatively, receiving notification from the system 100, that the system 100 is in the lockout condition, the user will generally pursue a lockout override. The lockout override may include an electronic key fob signal, a signal from an in-vehicle push button, an override command presented via a key pad, phone, smart phone, and the like, via testing and diagnostics devices, a physical key actuated mechanical lock, and the like.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A charging system for an electric vehicle, comprising:
a receptacle on the electric vehicle; and
a controller configured to,
responsive to a removal request and a discrepancy between a stored biometric record and first biometric data received from a first biometric sensor, compare the stored biometric record and second biometric data received from a second biometric sensor that is different from the first biometric sensor,
responsive to the comparison matching, generate an unlock request, and
responsive to the comparison not matching and an override command received from a user interface disposed within the electric vehicle, generate an unlock request.

2. The charge system of claim 1, wherein the stored biometric record includes data recorded from the first and second biometric sensors when a charge plug is coupled with the receptacle.

3. The charge system of claim 2, wherein the first biometric sensor is a fingerprint reader or a palmprint reader.

4. The charge system of claim 3, wherein the first biometric sensor is integrated with a switch.

5. The charge system of claim 3, wherein the second biometric sensor is a fingerprint reader, palmprint reader, microphone, or camera.

6. The charge system of claim 5, wherein the second biometric sensor is mounted on an outer surface of the electric vehicle in vicinity of the receptacle, on a door of the electric vehicle in vicinity of a door handle on the door, or on the outer surface of the electric vehicle in vicinity of the door handle.

7. The charge system of claim 2, wherein the biometric record comprises at least one of a thumbprint, a fingerprint, a palmprint, a retinal image, a facial image, a voice signature, and a voice signature of a code word.

8. A method of unlocking an electric vehicle plug comprising:
by a controller,
responsive to a disconnection request, comparing biometric data received from a first biometric sensor and a stored biometric record,
responsive to a discrepancy in the comparison, comparing second biometric data, received from a second biometric sensor that is different from the first biometric sensor, with the stored biometric record,
responsive to the second biometric data comparison matching, unlocking the electric vehicle plug, and
responsive to the second biometric data comparison not matching and an override command received from a remote server, unlocking the electric chicle plug.

9. The method of claim 8 further comprising, responsive to a charge request, activating the first biometric sensor, storing data as an entry in the stored biometric data, and releasing a locking mechanism such that the plug may be decoupled from an electric vehicle charge station and coupled with an electric vehicle.

10. The method of claim 9, wherein the first biometric sensor includes a fingerprint reader and palmprint reader.

11. The method of claim 10, wherein the first biometric sensor further includes a switch that, when depressed, is indicative of the charge request and the disconnection request.

12. The method of claim 10, wherein the second biometric sensor is a fingerprint reader, palmprint reader, microphone, or camera.

13. The method of claim 12, wherein the second biometric sensor is mounted on an outer surface of the electric vehicle in vicinity of an electric charge receptacle, on a door of the electric vehicle in vicinity of a door handle on the door, or on the outer surface of the electric vehicle in vicinity of the door handle.

14. The method of claim 9, the biometric record comprising at least one of a thumbprint, a fingerprint, a palmprint, a retinal image, a facial image, a voice signature, and a voice signature of a code word.

15. A charge station for an electric vehicle comprising:
a plug having a first biometric sensor and configured to be coupled with the electric vehicle; and
a controller configured to,
responsive to detection of the plug coupled with the electric vehicle, engage a locking mechanism,
responsive to a removal request and a match between biometric data received from the first biometric sensor with a stored biometric record, disengage the locking mechanism,
responsive to a mismatch between the biometric data with the stored biometric record, activate a second biometric sensor that is different from the first biometric sensor, and
responsive to a mismatch between biometric data received from the second biometric sensor with the stored biometric record and an override command received from a user interface disposed within the electric vehicle, disengage the locking mechanism.

16. The charge station of claim 15, wherein the stored biometric record includes data recorded from the first biometric sensor when the plug is coupled with a receptacle on the electric vehicle.

17. The charge station of claim 16, wherein the first biometric sensor includes a fingerprint reader and a palmprint reader.

18. The charge station of claim 17, wherein the first biometric sensor includes a switch that is mounted on the plug.

19. The charge station of claim 17, wherein the palmprint reader is on a housing handle section of the plug.

20. The charge station of claim 16, wherein the biometric record comprises at least one of a thumbprint, a fingerprint, a palmprint, a retinal image, a facial image, a voice signature, and a voice signature of a code word.

* * * * *